Aug. 9, 1932.   R. N. KIRCHER ET AL   1,870,254
COFFEE AND TEA MAKER
Filed Dec. 31, 1929
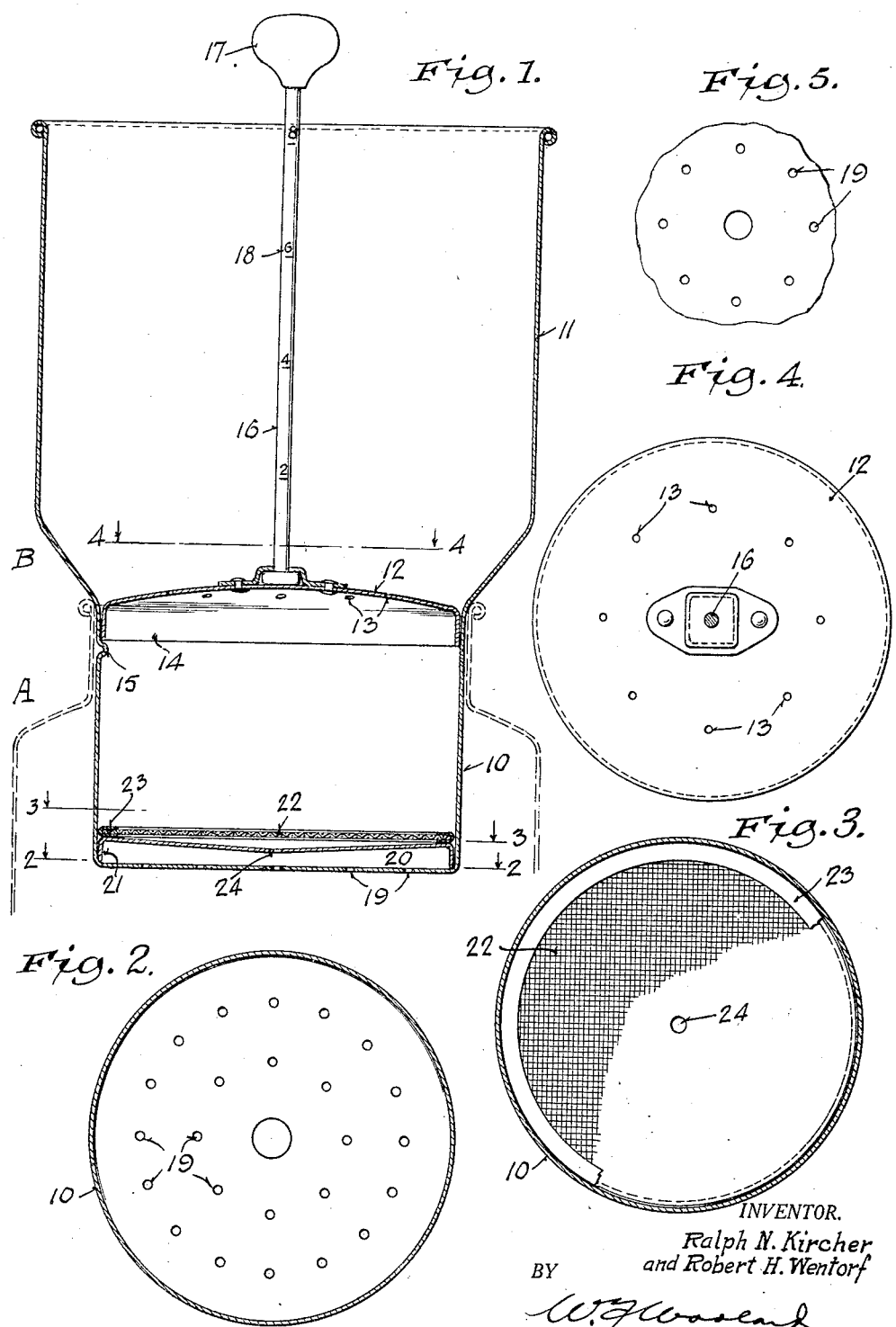
INVENTOR.
Ralph N. Kircher
and Robert H. Wentorf
BY
ATTORNEY.

Patented Aug. 9, 1932

1,870,254

UNITED STATES PATENT OFFICE

RALPH N. KIRCHER AND ROBERT H. WENTORF, OF WEST BEND, WISCONSIN, ASSIGNORS TO WEST BEND ALUMINUM COMPANY, OF WEST BEND, WISCONSIN, A CORPORATION OF WISCONSIN

COFFEE AND TEA MAKER

Application filed December 31, 1929. Serial No. 417,750.

Our invention relates to drip coffee percolators of improved and simplified construction, by the use of which coffee of superior quality for beverage purposes may be produced in the briefest time.

The invention resides in a percolator embodying a one-piece container having two divisions, one of which is adapted to receive a suitable quantity of ground coffee, and the other to receive a measured quantity of hot water, the flow of which latter is controlled so as to allow the water to saturate the coffee, and bring about a better extraction therefrom of its desirable flavors and essences.

A removable separator of novel construction is interposed between the divisions of the percolator, and serves to retard the flow of hot water so that the latter may saturate the coffee in a more thorough manner, to effect in a most satisfactory degree the accomplishment of the purposes of our invention. The separator is provided with a long handle, to facilitate easy positioning in the percolator. The long handle may be provided with a scale to indicate the quantity of hot water to be poured into the water receiving compartment or reservoir of the container.

A further function of the separator is that while in operation, it serves to confine the coffee to the compartment of the percolator in which it has been placed for subjection to an infusing action, and so prevents the coffee from rising to the surface of the head of water standing above it. The confinement thus provided for, that is, below the head of water, subjects the coffee to the pressure of the head of the water and results in a more complete permeation of the coffee and extraction of the desired properties, and consequently the production of a palatable beverage of vastly improved quality.

By the use of a simple adjunctive device, the percolator is well adapted to making tea.

These, and other features residing in the invention, will now be described, and the novelty thereof be pointed out in the appended claims.

In the accompanying drawing:

Figure 1 is a vertical central sectional view of our improved coffee percolator in its preferred form, shown as positioned in the mouth of a coffee pot, and showing the filter and also the tea adapter applicable thereto, arranged in the bottom of the coffee receiving division or compartment of the percolator.

Fig. 2 is a transverse sectional view on the line 2—2, Fig. 1, immediately adjacent the bottom of the percolator, looking in the direction of the arrows.

Fig. 3 is a like view on the line 3—3, Fig. 1, showing in plan the tea adapter, part of which is concealed, and also the filter, part of the latter being broken away.

Fig. 4 is a transverse sectional view on the line 4—4, Fig. 1, looking in the direction of the arrows, and showing in plan the removable separator which is adapted to be positioned at the entrance to the coffee receiving division or compartment of the percolator, or at some point approximately in the meeting line of the divisions or compartments of the container.

In the drawing, the letter A indicates the upper part of a conventional coffee pot, it being shown in phantom, and the letter B, our improved coffee percolator, the lower end of which is adapted to be entered into the open mouth of the pot, in the manner illustrated.

The shell or container of the percolator B is formed as a single tube, or otherwise as a single, one-piece, unitary structure, the side walls of which may, within our invention, be parallel with each other, or taper toward the lower end of the percolator; or the tube may be of different dimensions in the transverse sections of its length, as shown in Fig. 1, in which the lower portion of the percolator is of reduced diameter compared with the upper part thereof, this being the preferred form, inasmuch as it permits ready construction of an ample reservoir for the hot water. In all of the forms of the percolator, it will have an open upper end and a closed lower filtering end, which latter may be either a fixed part or a removable one. The lower part 10, constituting the coffee receiving division or chamber of the percolator, is adapted to have placed therein a selected quantity of ground coffee, and the upper part 11, constituting the hot water receiving division or compartment or reservoir of the percolator, to have poured therein a properly proportioned quantity of hot water, designed to be admitted with a retarded flow into the lower part or coffee receiving chamber 10 of the percolator, through the provision of means hereinafter described, so as to extract the desired essences from the coffee which previously has been placed therein.

A removable separator 12, provided with a number of small perforations 13, is positioned within the chamber, intermediately of the ends of the latter and transversely of the axis thereof, in the region of the meeting line of the coffee receiving compartment 10 and the water receiving compartment 11. The said separator is conveniently formed as a disc, the margin of which preferably is down-turned so as to form a depending flange or foot 14, which is adapted to be brought into engagement with a stop 15, formed inwardly of the coffee receiving compartment, or in other convenient manner, and so limit the extent of the movement of the separator into the coffee receiving compartment. By forming the part 14 as a circular flange, a closer joint is provided, and more of the water will be made to flow through the perforations 13; but such flange or foot may be omitted or replaced by a circumferential bead without impairment of the efficiency of the separator.

Attached to the upper side of the separator 12, centrally thereof, is the lower end of a post 16, extending above the top of the container, and having affixed to its projected upper end a knob or handle 17, preferably of insulating material, by means of which the separator 12 may be freely inserted into the container, and easily removed therefrom without discomfort due to heat. The elongated post 16 subserves an additional purpose, in that upon it may be placed marks 18 to indicate the quantity of hot water which is to be poured into the water compartment or reservoir to extract the essences from the coffee, the quantity of such hot water being proportioned to the amount of coffee placed in the chamber 10, and calculated with respect to the number of cups of coffee that it is desired to make. The lower end of the post 16 may be attached to the separator 12 in any desired or convenient manner.

The closed lower end or bottom of the percolator, may be provided with a larger number of small perforations 19, so as to constitute such bottom as a screen or filter, or foraminous structure, as shown in Fig. 2. The perforations 19 are of such restricted formation that the ground coffee will be restrained from movement therethrough, but are such as to permit the outflow of the hot water passing from the hot water compartment or reservoir 11, through the foraminated separator 12, and into the coffee receiving compartment or chamber 10. The saturation of the ground coffee placed in the said chamber, and the extraction of the desirable properties thereof, takes place with the passage of the hot water through the chamber 10 and out therefrom through the screened bottom thereof, the saturated liquid then dripping into the coffee pot.

In operation, the percolator is positioned upon a coffee pot, and a measured quantity of ground coffee is placed in the coffee compartment 10 of the percolator. The separator 12 is then properly placed, as before described. A duly proportioned quantity of hot water is then poured into the compartment 11 of the percolator. Such hot water finds its way slowly through the perforations 13 in the separator 12, into the chamber 10, and saturates the ground coffee therein, absorbing and extracting the valuable properties thereof, and then gravitates into the coffee pot. The location of the separator 12, in addition to its function of retarding the flow of hot water, acts further to confine the ground coffee to the space provided therefor, and prevents it from reaching the head column of water standing over it and floating to the top thereof. In this manner, the whole of the coffee is saturated under the pressure of a forced flow of the water.

Our invention is provided with an auxiliary device, which adapts the percolator to the purpose of making tea, a suitable tea pot being then employed in connection with the percolator B instead of the coffee pot A, as shown. Such tea adapter comprises a disc 20, of a diameter which approximates that of the coffee receiving compartment or chamber 10. Such disc is provided with a downturned flange 21 at its margin, adapted to rest upon the bottom of the percolator, and space the disc 20 therefrom. The greater part of the face of the disc 20, is displaced from the plane by the sheet out of which it is formed, so as to form a depression. The filter 22, which we construct of finely woven Monel wire, bound at its margin by a clamping ring 23, or otherwise, is placed over the disc 21, the parts contacting at their margins, and being spaced from each other for the greater part of their area by the depression in the top of the disc.

In using the tea adapter, the tea leaves are placed in the lower compartment or chamber 10 of the percolator, and rest upon the filter 22. The separator 12 is then positioned, and the water receiving compartment 11 is supplied with a suitable quantity of hot water. On account of the tendency of the tea leaves to mat or pack closely when moistened, the spacing of the filter 22 from the disc 20 prevents the clogging which would occur were the adapter not used, and permits the flow of the saturated liquid through the filter 22, into the depression in the disc 20, and through the perforation 24 arranged centrally thereof or otherwise. The liquid then flows through the bottom of the percolator and into the tea pot.

When making coffee, the disc 20 and the filter 22, and particularly the filter, may be left in the compartment or chamber 10, if desired. But the functions which these parts perform in making coffee, are generally present in the screen-like bottom of the container. However, if the filter 22 be always employed in making coffee, with or without the adapter 20, the perforations 19 or openings in the bottom of the container will not in such circumstances be as small as would be necessary, were the filter 22 not used. These variations in the arrangement, are within the scope of our invention.

We prefer to draw the shell or container, of the percolator B as a tube from a single sheet, but it will be within the scope of our invention to produce the tubular part in sections, and then join them in such manner as will produce a unitary formation constituted as a one-piece structure. It is preferable that the open end of the container be finished by a circumferential bead 25. Any usual cover may be placed upon the water receiving compartment 11, when desired.

Having thus described our invention, what we claim and desire to secure by Letters Patent of the United States, is:

1. In an infusing percolator or like device, a hollow container constituted as a one-piece tubular structure with one end open and the other closed, the closed end being perforated to permit liquid to flow through the container, the said container having a lower portion reduced in diameter to form a chamber for the material to be infused and an upper portion enlarged in diameter to receive a quantity of water, in combination with a perforated adapter, having a depression in its upper face disposed above the perforated bottom, a screen arranged over the said adapter and spaced therefrom through the said depression, and a foraminous separator positioned above the material in the chamber to retard the flow of water into the said chamber and confine the said material therein.

2. In a percolator or like device, a hollow container constituted as a one-piece tubular structure with one end open and the other closed, the closed end being perforated to permit liquid to flow through the container, the said container having a lower portion reduced in diameter to form a chamber for the material to be infused and an upper portion enlarged in diameter to receive a quantity of water, in combination with a perforated adapter having a supporting flange and a depression in its upper face disposed above the perforated bottom, a screen arranged over the said adapter and spaced therefrom through the said depression, and a foraminous separator positioned above the material in the chamber to retard the flow of water into the said chamber and confine the said material therein.

3. In a percolator or like device, a hollow container constituted as a one-piece tubular structure with one end open and the other closed, the closed end being perforated to permit liquid to flow through the container, the said container having a lower portion reduced in diameter to form a chamber for the material to be infused and an upper portion enlarged in diameter to receive a quantity of water, a perforated adapter having a depression in its upper face disposed above the perforated bottom, means for spacing the adapter from the perforated bottom, a screen arranged over the said adapter and spaced therefrom through the said depression, and a foraminous separator positioned above the material in the chamber to retard the flow of water into the said chamber and confine the said material therein.

4. In a percolator or like device, a hollow container constituted as a tubular structure open at its upper end and having at its lower end a screen to retain material placed in the container to be infused but permit liquid to flow therethrough, the lower portion of the said container being adapted to receive a charge of such material and the upper portion thereof to receive a quantity of hot water, a perforated disc adapter having a depression in its face disposed in the lower end of the container, and a screen above and spaced from the disc adapter to support the said material, in combination with a foraminous separator positioned in the container above the said material to retard the flow of water to the material and confine the latter to the space provided therefor, and an upwardly extending post attached to the separator to provide a handle whereby the separator may be positioned in the container and removed therefrom.

In testimony whereof, we have signed our names at West Bend, this 5th day of December, 1929.

RALPH N. KIRCHER.
ROBERT H. WENTORF.